United States Patent
Casper et al.

(10) Patent No.: US 12,543,640 B2
(45) Date of Patent: Feb. 10, 2026

(54) LAWNMOWER INCLUDING ELECTROSTATIC DISCHARGE

(71) Applicant: MILWAUKEE ELECTRIC TOOL CORPORATION, Brookfield, WI (US)

(72) Inventors: Maxwell A. Casper, Jackson, WI (US); Shane McCue, Greenfield, WI (US); Daniel R. Ertl, Brookfield, WI (US); Caleb N. Hille, West Chester, OH (US); Adam A. Ostrowski, Milwaukee, WI (US); Benjamin F. Shaske, Pewaukee, WI (US); Tyler L. Graham, Milwaukee, WI (US); Christopher S. Bullington, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 747 days.

(21) Appl. No.: 17/885,457

(22) Filed: Aug. 10, 2022

(65) Prior Publication Data
US 2023/0051663 A1   Feb. 16, 2023

Related U.S. Application Data

(60) Provisional application No. 63/231,401, filed on Aug. 10, 2021.

(51) Int. Cl.
*A01D 34/82* (2006.01)
*A01D 34/81* (2006.01)
*B60R 16/06* (2006.01)

(52) U.S. Cl.
CPC ........... *A01D 34/828* (2013.01); *A01D 34/81* (2013.01); *B60R 16/06* (2013.01)

(58) Field of Classification Search
CPC ...... A01D 34/81; A01D 34/828; B60R 16/06; H05F 3/02
See application file for complete search history.

(56) References Cited

U.S. PATENT DOCUMENTS

| | | | |
|---|---|---|---|
| 3,230,696 A | 1/1966 | Liljenberg | |
| 3,570,225 A | * 3/1971 | Miskiewicz | ......... A01D 34/828 56/17.4 |

(Continued)

FOREIGN PATENT DOCUMENTS

| | | |
|---|---|---|
| CA | 2244024 C | 1/2003 |
| CN | 101610937 A | 12/2009 |

(Continued)

OTHER PUBLICATIONS

JP_H02127113_U_I _-_ English_translation (Year: 1990).*
International Search Report and Written Opinion for Application No. PCT/US2022/040003 dated Nov. 25, 2022 (10 pages).

*Primary Examiner* — Alicia Torres
*Assistant Examiner* — Julia C Tran
(74) *Attorney, Agent, or Firm* — Dority & Manning, P.A.

(57) ABSTRACT

A walk-behind lawnmower includes a housing including a metal chassis, a handle coupled to the housing by support beams, a battery pack interface configured to receive a battery pack, a motor housed within the housing, a plurality of wheels attached to the housing, one or more cutting blades configured to be driven by the motor, and a skirt coupled to the metal chassis of the housing. The skirt is configured to provide a conductive path to discharge an electrostatic charge accumulated on the metal chassis.

12 Claims, 10 Drawing Sheets

(56) References Cited

U.S. PATENT DOCUMENTS

| | | | |
|---|---|---|---|
| 3,579,966 A | 5/1971 | Allina | |
| D227,286 S | 6/1973 | Thorud | |
| 3,750,378 A | 8/1973 | Thorud et al. | |
| 3,820,313 A | 6/1974 | Hoffmann | |
| 4,047,367 A | 9/1977 | Thorud | |
| 4,126,986 A | 11/1978 | Kidd | |
| 4,214,424 A | 7/1980 | Gobin | |
| D304,728 S | 11/1989 | Piorkowski | |
| 4,897,988 A | 2/1990 | Schweitz et al. | |
| D311,009 S | 10/1990 | Wilkins | |
| H1104 H * | 9/1992 | Cavanagh | 442/179 |
| D346,810 S | 5/1994 | Schulz et al. | |
| 5,398,491 A | 3/1995 | Hartley | |
| D359,291 S | 6/1995 | Tihonovich | |
| 5,638,667 A * | 6/1997 | Ellson | A01D 34/005 |
| | | | 56/DIG. 17 |
| 5,703,450 A * | 12/1997 | Josephs | A01D 34/828 |
| | | | 388/903 |
| D390,576 S | 2/1998 | Shimamura | |
| 5,910,091 A | 6/1999 | Tida et al. | |
| D421,265 S | 2/2000 | Ohsumi et al. | |
| 6,044,634 A | 4/2000 | Velke et al. | |
| D424,070 S | 5/2000 | Danthois | |
| 6,155,034 A | 12/2000 | Velke et al. | |
| D450,064 S | 11/2001 | Concari et al. | |
| D489,734 S | 5/2004 | Lin | |
| D544,501 S | 6/2007 | Chung Lee | |
| D600,254 S | 9/2009 | Lindars et al. | |
| D605,667 S | 12/2009 | Peterson et al. | |
| 7,726,110 B2 | 6/2010 | Nicholson | |
| D620,029 S | 7/2010 | Baetica | |
| D627,371 S | 11/2010 | Baetica | |
| D648,354 S | 11/2011 | Hattori et al. | |
| 8,046,980 B1 | 11/2011 | Schroeck | |
| D652,846 S | 1/2012 | Stratford et al. | |
| D653,265 S | 1/2012 | Stratford et al. | |
| D665,823 S | 8/2012 | Hannig | |
| D685,822 S | 7/2013 | Elgin et al. | |
| D834,071 S | 11/2018 | Näslund et al. | |
| D834,072 S | 11/2018 | Näslund et al. | |
| 2002/0179311 A1 * | 12/2002 | Alper | B60R 16/06 |
| | | | 174/5 SG |
| 2004/0237493 A1 | 12/2004 | Schroeder et al. | |
| 2005/0257964 A1 | 11/2005 | Derby | |
| 2007/0271892 A1 | 11/2007 | Sasaoka | |
| 2008/0112105 A1 * | 5/2008 | Chen | B60R 16/06 |
| | | | 361/220 |
| 2009/0266042 A1 | 10/2009 | Mooney et al. | |
| 2010/0037418 A1 * | 2/2010 | Hussey | A47L 9/12 |
| | | | 901/1 |
| 2010/0115901 A1 * | 5/2010 | Hurst | A01D 43/063 |
| | | | 56/2 |
| 2011/0022267 A1 | 1/2011 | Murphy | |
| 2014/0157747 A1 | 6/2014 | Shoji et al. | |
| 2016/0047463 A1 | 2/2016 | Helin et al. | |
| 2016/0338266 A1 | 11/2016 | Yamaoka et al. | |
| 2017/0006763 A1 | 1/2017 | Bejcek et al. | |
| 2017/0202138 A1 * | 7/2017 | Pellenc | A01D 34/81 |
| 2017/0202140 A1 | 7/2017 | Lopez et al. | |
| 2018/0160620 A1 | 6/2018 | Wang et al. | |
| 2018/0160622 A1 * | 6/2018 | Pellenc | A01D 43/063 |
| 2019/0269067 A1 | 9/2019 | Fukano et al. | |
| 2020/0107497 A1 | 4/2020 | Ferrell et al. | |
| 2020/0375095 A1 | 12/2020 | Koto et al. | |
| 2021/0251143 A1 | 8/2021 | Gaeddert et al. | |

FOREIGN PATENT DOCUMENTS

| | | |
|---|---|---|
| CN | 210202483 U | 3/2020 |
| CN | 111406498 A | 7/2020 |
| CN | 211671393 U | 10/2020 |
| DE | 154054 A1 | 2/1982 |
| EP | 3437453 B1 | 3/2021 |
| JP | H02127113 U | 10/1990 |
| JP | H06169624 A | 6/1994 |
| JP | 2007116958 A | 5/2007 |
| JP | 2016187978 A | 11/2016 |
| KR | 20020055433 A | 7/2002 |
| KR | 1020060046012 A | 5/2006 |
| WO | 9410827 A1 | 5/1994 |
| WO | 2010002298 A1 | 1/2010 |
| WO | 2010024696 A1 | 3/2010 |
| WO | 2014062176 A1 | 4/2014 |

* cited by examiner

LAWNMOWER INCLUDING ELECTROSTATIC DISCHARGE

RELATED APPLICATIONS

This application claims the benefit of U.S. Provisional Patent Application No. 63/231,401, filed Aug. 10, 2021, the entire content of which is hereby incorporated by reference.

SUMMARY

Embodiments described herein relate to discharging static buildup of electric lawnmowers. Specifically, embodiments described herein provide a rear skirt coupled to the lawnmower housing and configured to discharge static buildup of the lawnmower housing.

Walk-behind lawnmowers described herein include a housing including a metal chassis, a handle coupled to the housing by support beams, a battery pack interface configured to receive a battery pack, a motor housed within the housing, one or more cutting blades configured to be driven by the motor, and a skirt coupled to the metal chassis of the housing. The skirt is configured to provide a conductive path to discharge an electrostatic charge accumulated on the metal chassis.

Walk-behind lawnmowers described herein include a housing, a handle coupled to the housing by support beams, a battery pack interface configured to receive a battery pack, a motor housed within the housing, one or more cutting blades configured to be driven by the motor, and a skirt coupled to the housing. The skirt includes a conductive path molded into the skirt. The conductive path is configured to discharge an electrostatic charge accumulated on the housing.

Methods described herein provide for discharging electrostatic buildup of a walk-behind lawnmower. The lawnmower includes a housing including a metal chassis, a motor housed within the housing, and a battery pack interface configured to receive a battery pack. The methods include detecting, via a controller, actuation of an input device, controlling, via the controller, the motor based on actuation of the input device, and discharging, via a rear skirt connected to the metal chassis, an electrostatic buildup accumulated on the metal chassis of the lawnmower.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

DETAILED DESCRIPTION

Figure 1:
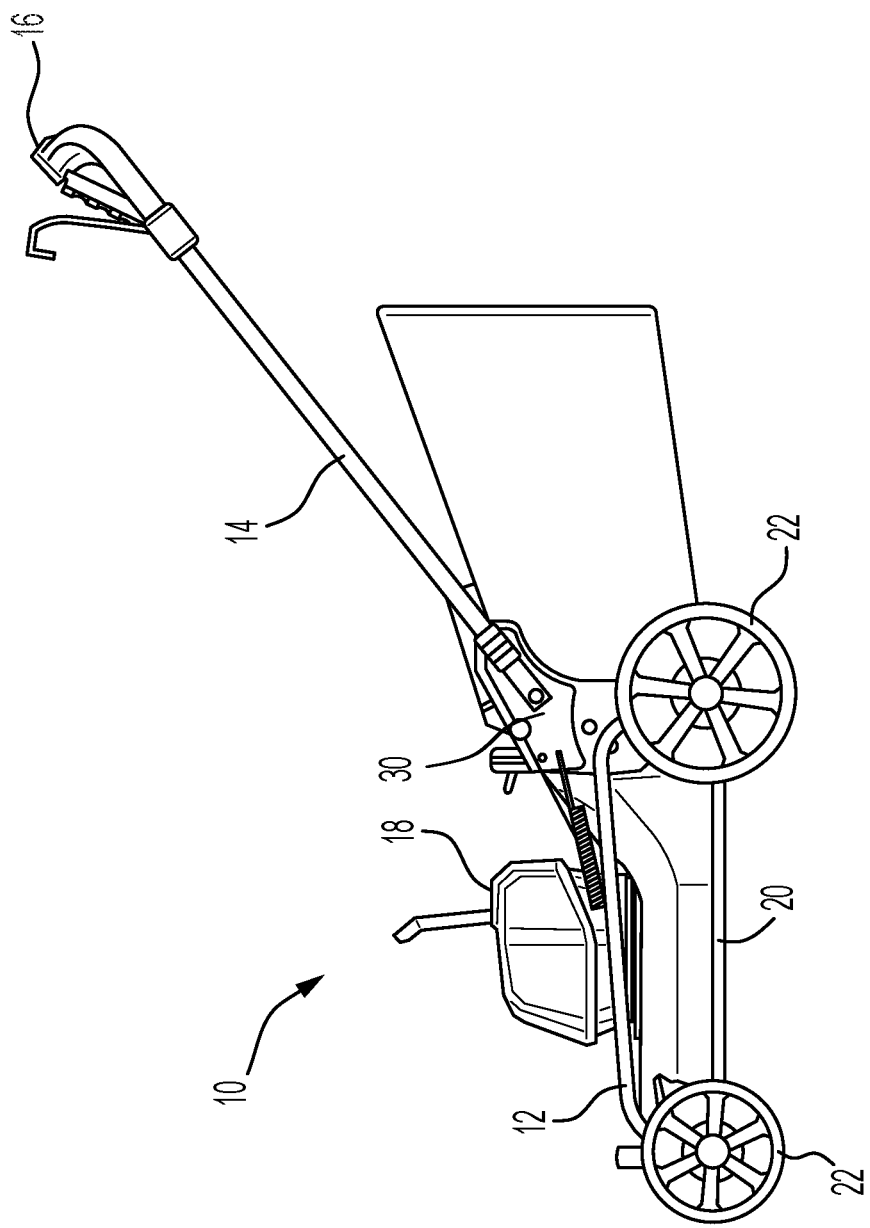
FIG. 1 is a lawnmower, according to some embodiments.

FIG. 1 illustrates a lawnmower 10 (e.g., a walk-behind lawnmower), according to some embodiments. The lawnmower 10 includes a housing 12 and a handle 16 coupled to the housing 12 by support beams 14. A motor housing 18 is coupled to an upper portion of the housing 12 and houses a motor configured to drives cutting blades 20. The blades 20 are coupled to a lower portion of the housing 12. The lawnmower 10 includes a plurality of wheels 22 driven by the motor. In some embodiments, the plurality of wheels 22 are driven by an auxiliary motor within the motor housing 18. A portion of the housing 12 forms a metal chassis 30, as described below in more detail.

Figure 2A:
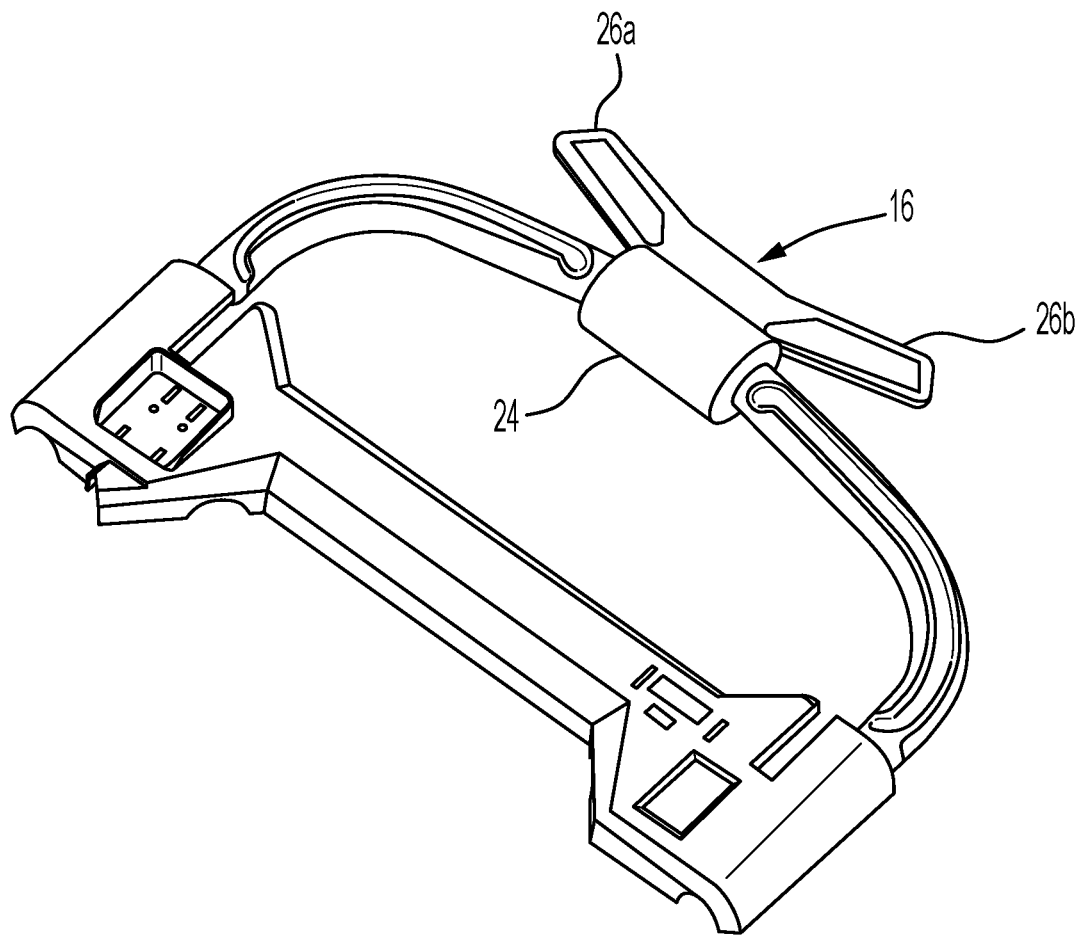
FIGS. 2A-2B are perspective views of a handle of the lawnmower of FIG. 1, according to some embodiments.
Figure 2B:
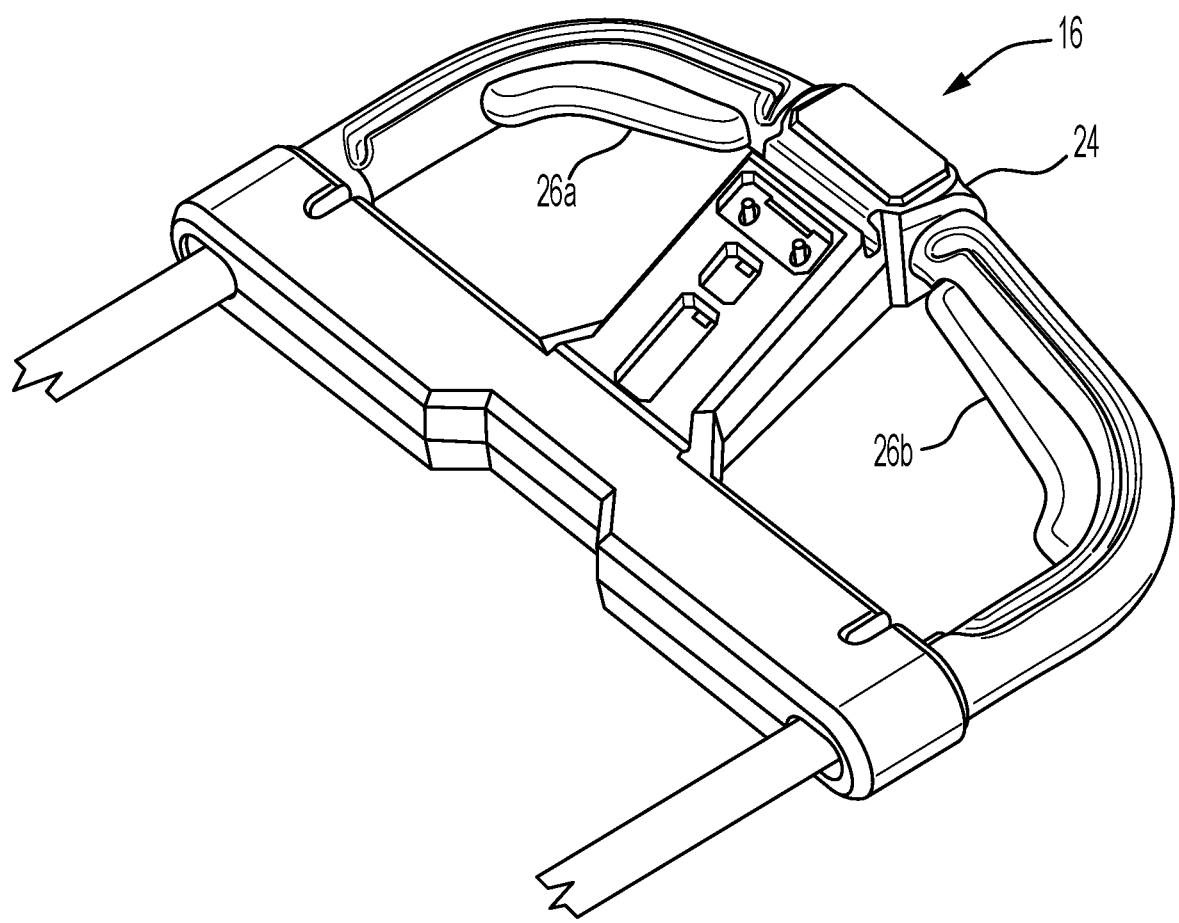

FIGS. 2A-2B illustrate the handle 16, according to some embodiments. The handle 16 includes a handle housing 24. In the embodiment of FIG. 2A, a first paddle 26a and a second paddle 26b (e.g., paddles 26) extend from the handle housing 24 and act as a switch or trigger. In the embodiment of FIG. 2B, the first paddle 26a and second paddle 26b are both embedded in the handle housing 24. In both embodiments, operation of the first paddle 26a and the second paddle 26b may drive the motor and/or the auxiliary motor.

Figure 3:
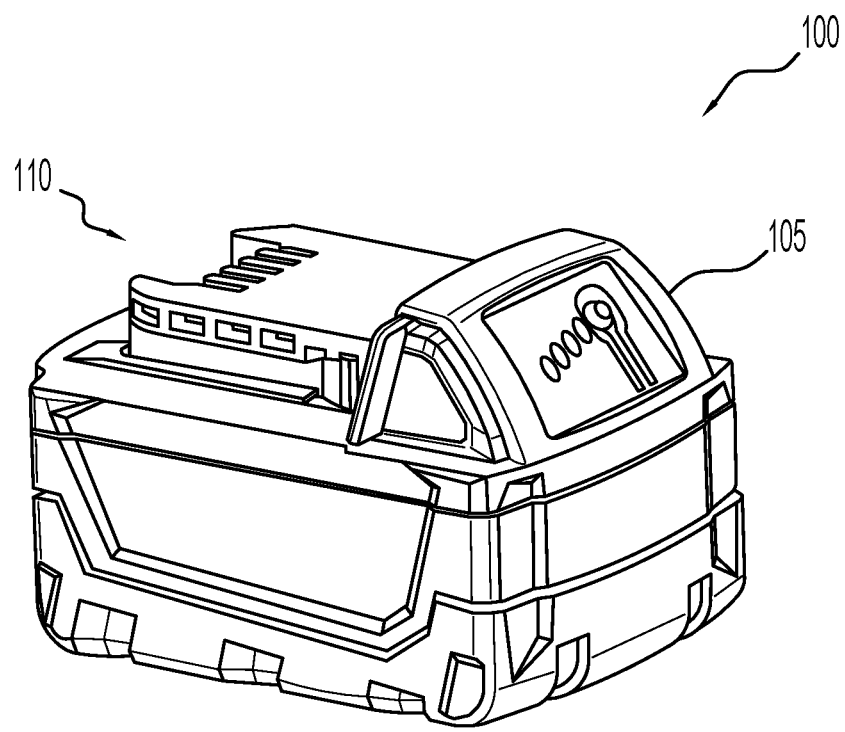
FIG. 3 is a perspective view of a battery pack, according to some embodiments.

In some embodiments, the lawnmower 10 is a battery-powered lawnmower. FIG. 3 illustrates a battery pack 100 that includes a battery pack housing 105 and an interface portion 110 for connecting the battery pack 100 to a device, such as the lawnmower 10. While embodiments described herein primarily relate to a battery-powered lawnmower, in some embodiments, the lawnmower 10 is a gasoline-powered lawnmower, a corded lawnmower, or another type of walk-behind lawnmower.

Figure 4:
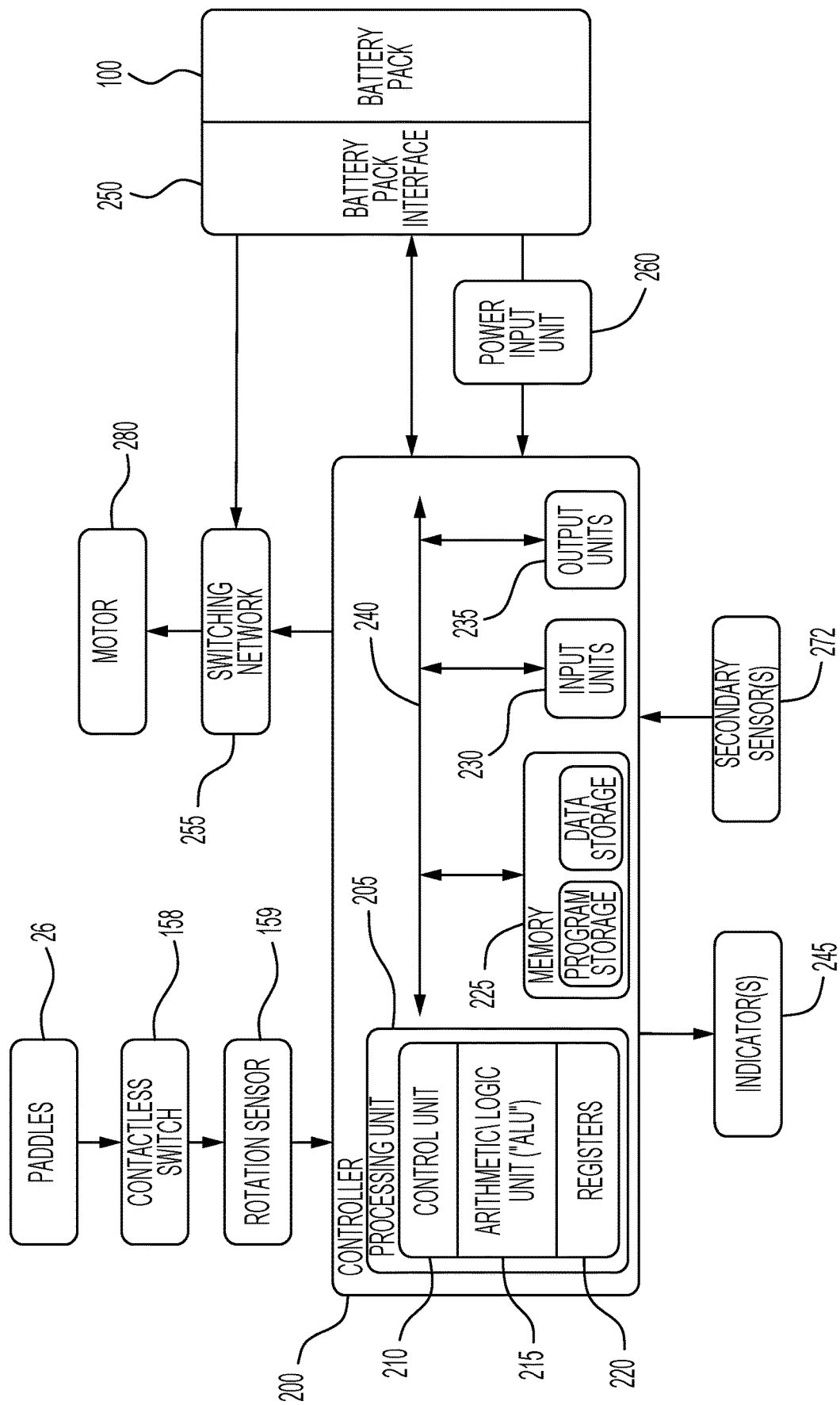
FIG. 4 is a block diagram of a control system for the lawnmower of FIG. 1, according to some embodiments.

A controller 200 for the lawnmower 10 is illustrated in FIG. 4. The controller 200 is electrically and/or communicatively connected to a variety of modules or components of the lawnmower 10. For example, the illustrated controller 200 is connected to indicators 245, secondary sensor(s) 272 (e.g., a speed sensor, a voltage sensor, a temperature sensor, a current sensor, etc.), the paddles 26 (via a contactless switch 158 and a rotation sensor 159), a power switching network 255, and a power input unit 260. In some embodiments, the secondary sensor(s) 272 include, among other sensor(s), a current sensor, a voltage sensor, a temperature sensor, an orientation sensor, a speed sensor, and other sensors that assist in monitoring operation of the lawnmower 10.

The controller 200 includes a plurality of electrical and electronic components that provide power, operational control, and protection to the components and modules within the controller 200 and/or lawnmower 10. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 4), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 4 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the lawnmower 10 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The controller 200 drives the motor 280 to rotate the blades 20 and/or the plurality of wheels 22 in response to a user's actuation of the paddles 26. Depression of the paddles 26 actuates the contactless switch 158. A magnet coupled to the contactless switch 158 rotates with actuation of the contactless switch 158. Rotation of the magnet is sensed by the rotation sensor 159, which outputs a signal to the controller 200 to drive the motor 280, and therefore the blades 20 and/or the plurality of wheels 22. While embodiments described herein primarily relate to a contactless switch configuration, in other instances, the lawnmower 10 may include a trigger switch that is physically actuated in response to actuation of the paddles 26.

In some embodiments, the controller 200 controls a power switching network 255 (e.g., a FET switching bridge) to drive the motor 280. For example, the power switching network 255 may include a plurality of high side switching elements (e.g., FETs) and a plurality of low side switching elements. The controller 200 may control each of the plurality of high side switching elements and the plurality of low side switching elements to drive each phase of the motor 280. When the paddles 26 are released, the controller 200 may apply a braking force to the motor 280. For example, the power switching network 255 may be controlled to more quickly deaccelerate the motor 280. In some embodiments, the controller 200 drives an auxiliary motor to drive the plurality of wheels 22. For example, the motor 280 is controlled to drive the blades 20, and the auxiliary motor is controlled to drive the plurality of wheels 22. The auxiliary motor may be controlled via a second power switching network.

The indicators 245 are also connected to the controller 200 and receive control signals from the controller 200 to turn on and off or otherwise convey information based on different states of the lawnmower 10. The indicators 245 include, for example, one or more light-emitting diodes (LEDs), or a display screen. The indicators 245 can be configured to display conditions of, or information associated with, the lawnmower 10.

A battery pack interface 250 is connected to the controller 200 and is configured to couple with the battery pack 100. The battery pack interface 250 includes a combination of mechanical (e.g., a battery pack receiving portion) and electrical components configured to and operable for interfacing (e.g., mechanically, electrically, and communicatively connecting) the lawnmower 10 with the battery pack 100. The battery pack interface 250 is coupled to the power input unit 260. The battery pack interface 250 transmits the power received from the battery pack 100 to the power input unit 260. The power input unit 260 includes active and/or passive components (e.g., voltage step-down controllers, voltage converters, rectifiers, filters, etc.) to regulate or control the power received through the battery pack interface 250 and to the controller 200. In some embodiments, the battery pack interface 250 is also coupled to the power switching network 255. The operation of the power switching network 255, as controlled by the controller 200, determines how power is supplied to the motor 280.

Figure 5:
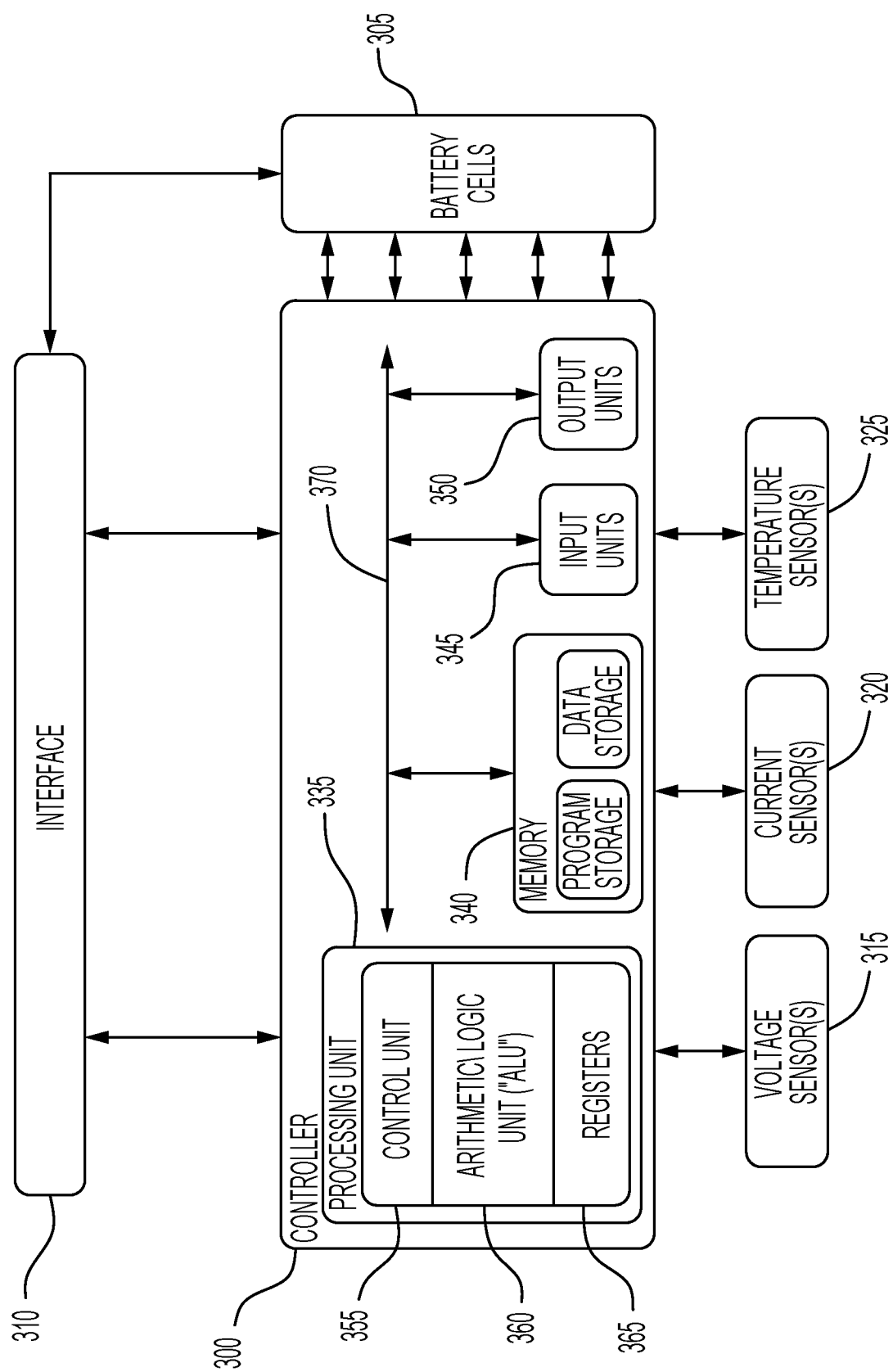
FIG. 5 is a block diagram of a control system for the battery pack of FIG. 3, according to some embodiments.

FIG. 5 illustrates a control system for the battery pack 100. The control system includes a controller 300. The controller 300 is electrically and/or communicatively connected to a variety of modules or components of the battery pack 100. For example, the illustrated controller 300 is connected to one or more battery cells 305 and an interface 310 (e.g., the interface portion 110 of the battery pack 100 illustrated in FIG. 3). The controller 300 is also connected to one or more voltage sensors or voltage sensing circuits 315, one or more current sensors or current sensing circuit 320, and one or more temperature sensors or temperature sensing circuits 325. The controller 300 includes combinations of hardware and software that are operable to, among other things, control the operation of the battery pack 100, monitor a condition of the battery pack 100, enable or disable charging of the battery pack 100, enable or disable discharging of the battery pack 100, etc.

The controller 300 includes a plurality of electrical and electronic components that provide power, operational control, and protection to the components and modules within the controller 300 and/or the battery pack 100. For example, the controller 300 includes, among other things, a processing unit 335 (e.g., a microprocessor, a microcontroller, or another suitable programmable device), a memory 340, input units 345, and output units 350. The processing unit 335 includes, among other things, a control unit 355, an arithmetic logic unit ("ALU") 360, and a plurality of registers 365 (shown as a group of registers in FIG. 5), and is implemented using a known computer architecture (e.g., a modified Harvard architecture, a von Neumann architecture, etc.). The processing unit 335, the memory 340, the input units 345, and the output units 350, as well as the various modules or circuits connected to the controller 300, are connected by one or more control and/or data buses (e.g., common bus 370). The control and/or data buses are shown generally in FIG. 5 for illustrative purposes. The use of one or more control and/or data buses for the interconnection between and communication among the various modules, circuits, and components would be known to a person skilled in the art in view of the invention described herein.

The memory 340 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 335 is connected to the memory 340 and executes software instructions that are capable of being stored in a RAM of the memory 340 (e.g., during execution), a ROM of the memory 340 (e.g., on a generally permanent basis), or another non-transitory computer readable medium such as another memory or a disc. Software included in the implementation of the battery pack 100 can be stored in the memory 340 of the controller 300. The software includes, for example, firmware, one or more applications, program data, filters, rules, one or more program modules, and other executable instructions. The controller 300 is configured to retrieve from the memory 340 and execute, among other things, instructions related to the control processes and methods described herein. In other constructions, the controller 300 includes additional, fewer, or different components.

The interface 310 includes a combination of mechanical components (e.g., rails, grooves, latches, etc.) and electrical components (e.g., one or more terminals) configured to and operable for interfacing (e.g., mechanically, electrically, and communicatively connecting) the battery pack 100 with another device (e.g., a power tool, a battery pack charger, the lawnmower 10, etc.). For example, the interface 310 is configured to receive power via a power line between the one or more battery cells 305 and the interface 310. The interface 310 is also configured to communicatively connect to the controller 300.

During operation of the lawnmower 10, the metal chassis 30 of the lawnmower 10 can accumulate static charge. This accumulated static charge can be potentially dangerous to an operator of the lawnmower 10. For example, should the user come into contact with the metal chassis 30 or another conductive portion of the lawnmower 10 connected to the metal chassis 30, the accumulated static charge on the metal chassis 30 can be discharged through the user in the form of an electric shock.

Figure 6:
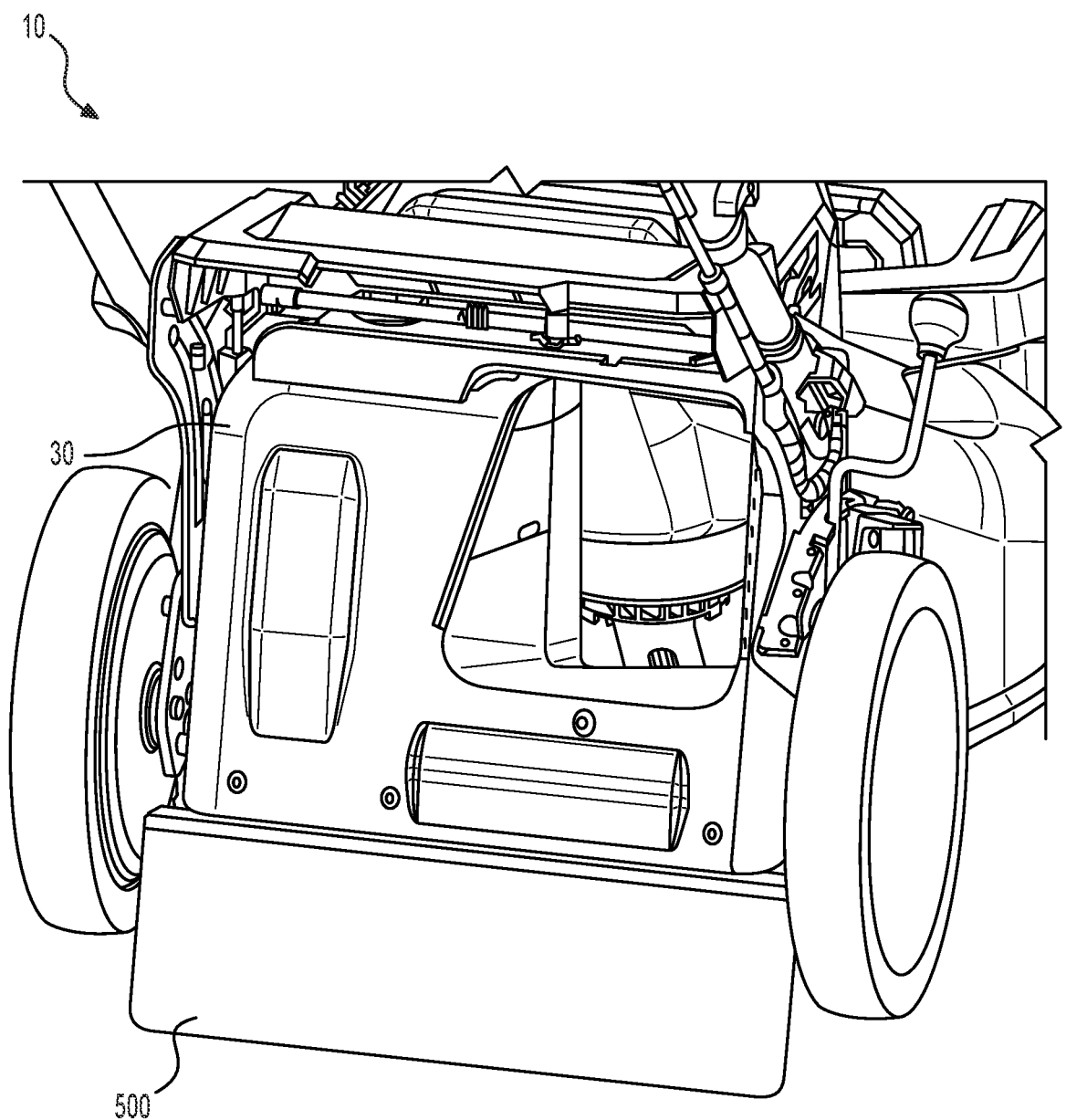
FIG. 6 illustrates a rear skirt of the lawnmower of FIG. 1, according to some embodiments.

FIG. 6 illustrates a rear skirt 500 (also referred to as skirt 500) of the lawnmower 10 coupled below the metal chassis 30. The rear skirt 500 is connected to the metal chassis 30 such that the rear skirt 500 provides a conductive path from the metal chassis 30 to ground. Accordingly, the rear skirt 500 creates a discharge path for any static charge accumulated on the metal chassis 30, thereby achieving electrostatic discharge ("ESD") of the metal chassis 30. As one example, the rear skirt 500 is composed of a metalized plastic or rubber (e.g., metal is integrated with the plastic or rubber at manufacture to allow the rear skirt 500 to conduct electricity). In other examples, the rear skirt 500 is made of or includes a conductive polymer (e.g., polyacetylene (PA), polyaniline (PAM), polypyrrole (PPy), polythiophene (PTH), poly(para-phenylene) (PPP), poly(phenylenevinylene) (PPV), polyfuran (PF), and the like). In some embodiments, the rear skirt 500 is coated with a metallic coating to make the rear skirt 500 electrically conductive. The rear skirt 500 may include a metallic outer boarder (e.g., a metal frame is placed around a circumference of the rear skirt 500) to provide the conductive path to ground. In other embodiments, the rear skirt 500 is made of metal and the entire rear skirt 500 can conduct electricity. In such embodiments, the entire surface area of the rear skirt 500 provides a conductive path.

Figure 7:
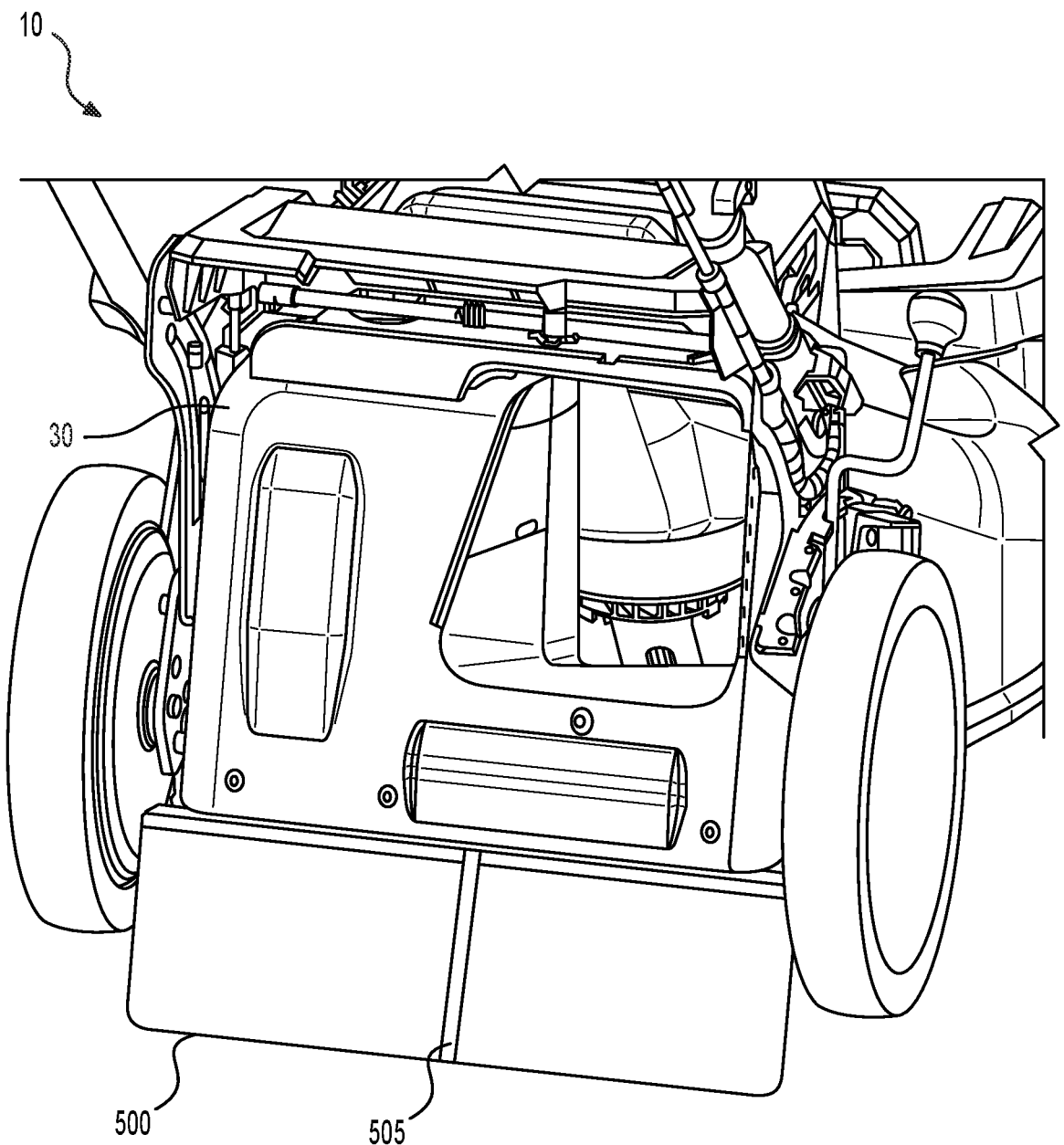
FIG. 7 illustrates another rear skirt of the lawnmower of FIG. 1, according to some embodiment.
Figure 8:
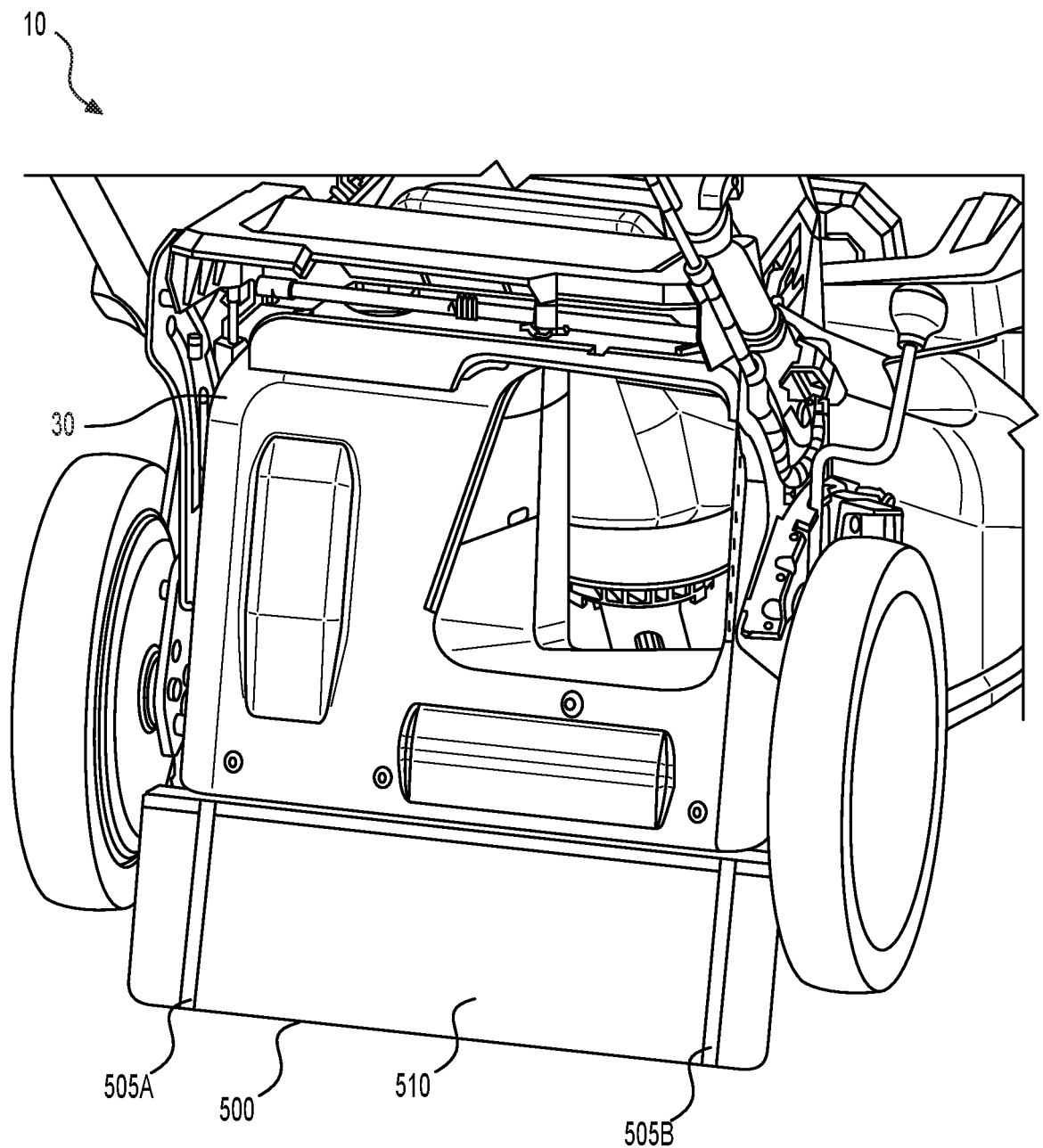
FIG. 8 illustrates another rear skirt of the lawnmower of FIG. 1, according to some embodiments.

In some instances, rather than the entire rear skirt 500 providing a conductive path (as shown in FIG. 6), the rear skirt 500 includes an embedded conductive path. For example, FIG. 7 and FIG. 8 illustrate other embodiments of the rear skirt 500 including one or more conductive paths 505. In FIG. 7, the conductive path 505 is configured as a strip of metal or a wire (e.g., copper, aluminum, brass, gold, or the like) physically attached to (e.g., screwed, adhered, embedded within, molded within, or otherwise fastened) the rear skirt 500. The conductive path 505 is a conductive metal that provides a conductive path from the metal chassis 30 to the ground, therefore discharging any build-up of static electricity. In some embodiments, the conductive path 505 is molded into the rear skirt 500 (e.g., at manufacture). In the embodiments of FIG. 7 and FIG. 8, the rear skirt 500 may be constructed of a non-conductive material (e.g., plastic). In the example of FIG. 7, the conductive path 505 is positioned at approximately a center of the rear skirt 500. In other embodiments, the conductive path 505 may be positioned elsewhere on or within the rear skirt 500, such as at the edges of the rear skirt 500.

In FIG. 8, more than one conductive path 505 is included within the rear skirt 500. Particularly, in the example of FIG. 8, a first conductive path 505A is provided on a first end of the rear skirt 500 and a second conductive path 505B is provided on a second end of the rear skirt 500. The first conductive path 505A and the second conductive path 505B are separated by a non-conductive portion 510. While only two conductive paths are illustrated, in some embodiments, the rear skirt 500 includes more than two conductive paths (e.g., three conductive paths, four conductive paths, etc.).

Figure 9:
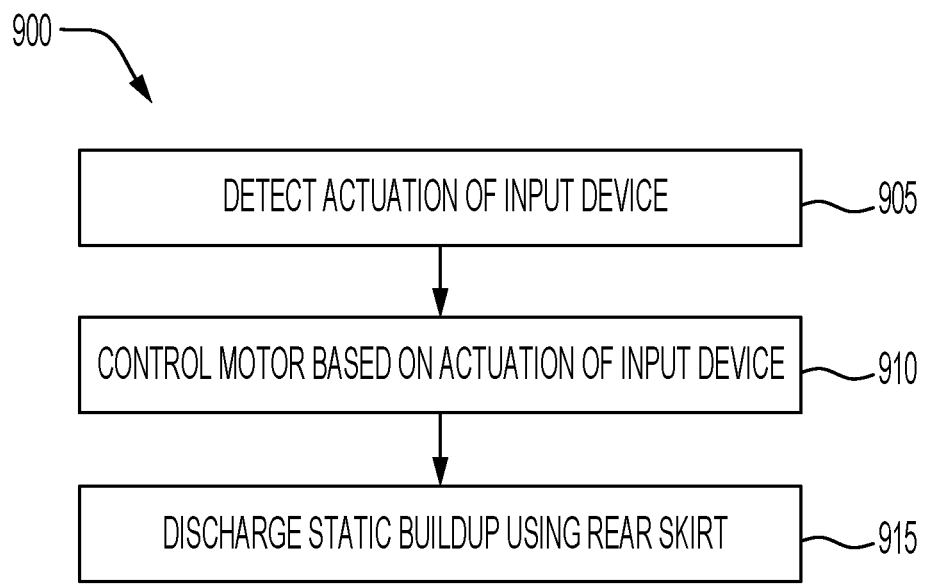
FIG. 9 is a block diagram of a method performed by the controller of FIG. 4, according to some embodiments.

FIG. 9 provides a method 900 for discharging the metal chassis 30 of the lawnmower 10, according to some embodiments. At block 905, the method 900 includes detecting, with the controller 200, actuation of an input device. For example, the controller 200 detects, using the rotation sensor 159, actuation of the paddles 26. At block 910, the method 900 includes controlling, with the controller 200, the motor 280 based on actuation of the input device. For example, the controller 200 receives the output from the rotation sensor 159 and drives the motor 280 by controlling the power switching network 255 based on the output from the rotation sensor 159. In some embodiments, the controller 200 controls the output of the auxiliary motor based on the actuation of the paddles 26.

At block 915, the method 900 includes discharging, with the rear skirt 500, an electrostatic buildup accumulated on the metal chassis 30 of the lawnmower 10 to the ground. As one example, the electrostatic charge that has accumulated on the metal chassis 30 is discharged to the ground through the conductive path 505 of the rear skirt 500 in FIG. 7. As another example, the accumulated electrostatic discharge occurs through the rear skirt 500 itself, such as the rear skirt 500 as described in FIG. 6. In some embodiments, the accumulated electrostatic charge is continuously discharged to the ground during operation of the motor 280. In some embodiments, an electrical connection is made (e.g., between the metal chassis 30 and the rear skirt 500 upon actuation of the input device (e.g., paddles 26).

Thus, embodiments described herein provide, among other things, a rear skirt coupled to the lawnmower housing and configured to discharge static buildup of the lawnmower housing.

What is claimed is:

1. A walk-behind lawnmower comprising:
a housing including a metal chassis;
a handle coupled to the housing by support beams;
a battery pack interface configured to receive a battery pack;
a motor housed within the housing;
one or more cutting blades configured to be driven by the motor; and
a skirt connected to the metal chassis of the housing, wherein the skirt is configured to provide a conductive path to discharge an electrostatic charge accumulated on the metal chassis, and wherein the conductive path comprises a rigid metal frame placed around a circumference of the skirt.

2. The walk-behind lawnmower of claim 1, wherein the skirt comprises a metalized plastic.

3. The walk-behind lawnmower of claim 1, wherein the skirt comprises a conductive polymer.

4. A walk-behind lawnmower comprising:
a housing;
a handle coupled to the housing by support beams;
a battery pack interface configured to receive a battery pack; a motor housed within the housing;
one or more cutting blades configured to be driven by the motor; and
a skirt coupled to the housing, wherein the skirt includes a conductive path molded into an outer surface of the skirt, and the conductive path is configured to discharge an electrostatic charge accumulated on the housing;
wherein the conductive path comprises a first conductive path coupled to a first end of the skirt and a second conductive path coupled to a second end of the skirt spaced apart from the first end of the skirt, and wherein the first conductive path and the second conductive path are separated by a non-conductive portion of the skirt.

5. The walk-behind lawnmower of claim 4, wherein the first conductive path and the second conductive path includes a metal strip.

6. The walk-behind lawnmower of claim 5, wherein the metal strip is composed of one selected from a group consisting of copper, aluminum, brass, and gold.

7. The walk-behind lawnmower of claim 4, wherein the skirt is composed of a non-conductive material.

8. A method of discharging electrostatic buildup of a walk-behind lawnmower, the lawnmower including a housing including a metal chassis, a motor housed within the housing, and a battery pack interface configured to receive a battery pack, the method comprising:
detecting, via a controller, actuation of an input device;
controlling, via the controller, the motor based on actuation of the input device; and
discharging, via a rear skirt connected to the metal chassis, an electrostatic buildup accumulated on the metal chassis of the lawnmower, wherein the rear skirt comprises a conductive path including a rigid metal frame placed around a circumference of the rear skirt.

9. The method of claim 8, wherein the rear skirt comprises a metalized plastic.

10. The method of claim 8, wherein the rear skirt comprises a conductive polymer.

11. The method of claim 8, wherein the conductive path includes a metal strip.

12. The method of claim 11, wherein the metal strip is composed of one selected from a group consisting of copper, aluminum, brass, and gold.

* * * * *